(No Model.)
G. L. DUNCAN.
SELF OPENING GATE.
No. 521,524. Patented June 19, 1894.
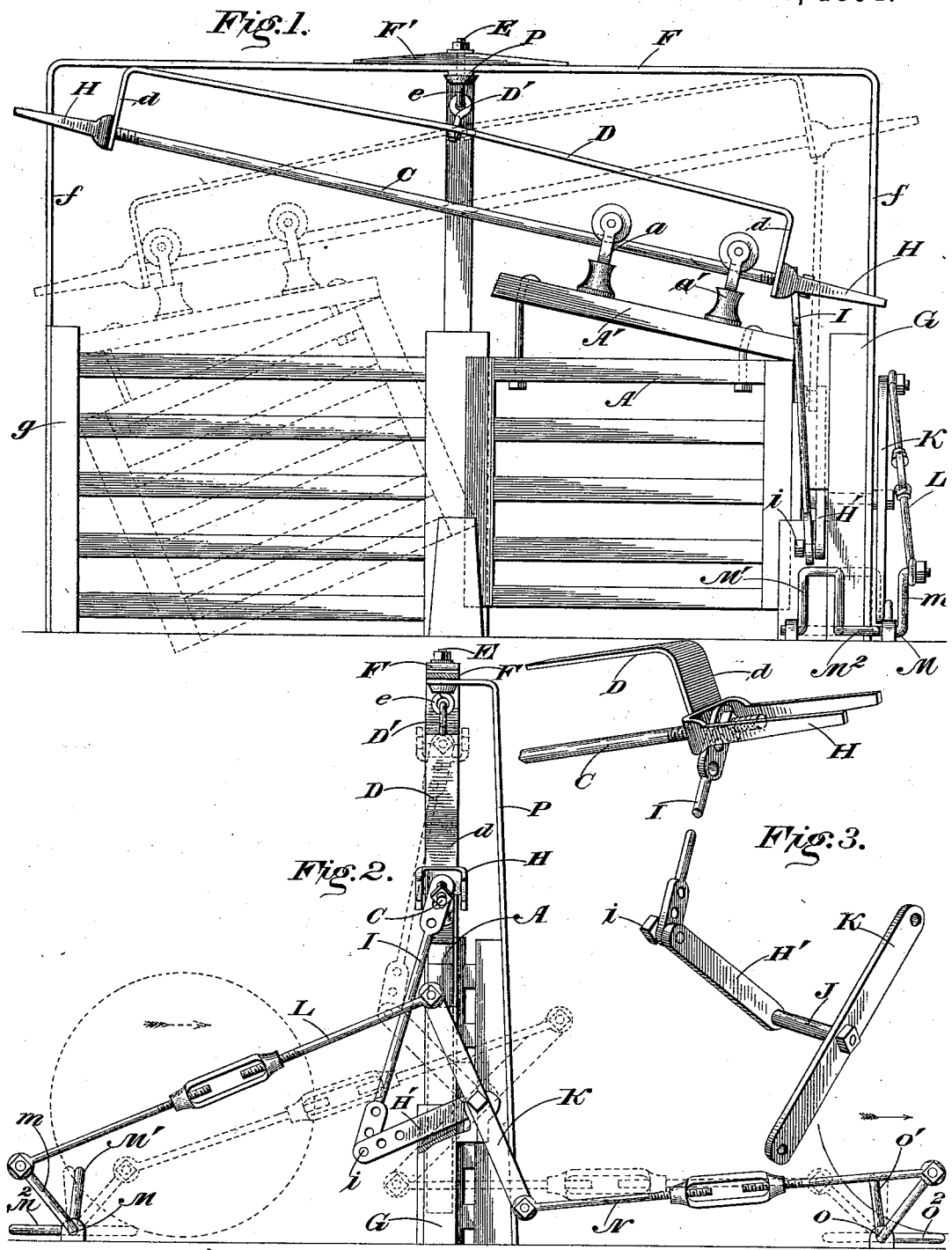
Witnesses:
M. E. Fowler
James R. Mansfield
Inventor:
George L. Duncan
by Alexander & Dowell
Attorneys.
THE NATIONAL LITHOGRAPHING COMPANY,
WASHINGTON, D. C.

UNITED STATES PATENT OFFICE.

GEORGE LUTHER DUNCAN, OF PIQUA, OHIO.

SELF-OPENING GATE.

SPECIFICATION forming part of Letters Patent No. 521,524, dated June 19, 1894.

Application filed February 9, 1894. Serial No. 499,653. (No model.)

*To all whom it may concern:*

Be it known that I, GEORGE LUTHER DUNCAN, of Piqua, in the county of Miami and State of Ohio, have invented certain new and useful Improvements in Self-Opening Gates; and I do hereby declare that the following is a full, clear, and exact description thereof, reference being had to the accompanying drawings, and to the letters of reference marked thereon, which form part of this specification.

This invention is an improved automatically operated farm gate, its object being to enable the gate to be opened without manual handling. The gate is suspended from an oscillating support, upon which the gate slides open or shut, as the support is oscillated.

The invention consists in the novel construction and combination of parts hereinafter claimed, and described in detail as follows, reference being had to the accompanying drawings by letters of reference, in which—

Figure 1 is a side elevation of the gate, closed, but indicating it opened by dotted lines. Fig. 2 is an end view of the gate showing its operating devices. Fig. 3 is a detail perspective view of the gate support and operating devices.

A designates the gate, of any desired construction, to the top of this gate are attached two or more pulley hangers $a$, $a'$, the former standing farther above the top rail of the gate than the latter. The hangers are of any suitable construction, and may be connected direct to the top of gate at proper points, or (as shown) to a bar A' which is attached to the top of the gate, at an angle thereto. These hangers suspend the gate on a rod C which is tensely strung between the downwardly bent ends $d$ of a bar D, which can be made of flat metal. This bar D is centrally pivoted and suspended longitudinally above the gate as shown, by a bolt eye or hook D' which engages a similar eye $e$ on a bolt E suspended from a horizontal bar F, which is supported upon vertical pieces $f, f$, attached to the outermost gate post G, and to another post $g$ in line with post G. The bar F and pieces $f, f$, may be formed of a continuous metal bar. To prevent bar F from sagging at the center a reinforce strip F' is placed between the top of the bar and the nut or head of bolt E, as shown. A similar reinforce may be placed under the center of bar D if desired.

The rod C and bar D are prevented from wabbling or turning laterally by guide yokes H attached to the ends of the bar D. As shown these yokes are U-shaped metal straps, having holes in their bends by which they are strung on the ends of rod C projecting through ends $d$, and secured by the same nuts that connect the rod to the bar. When the front end of bar D is raised the gate is tilted and travels backward on the rod C to its open position, and when the front end of bar D is lowered the gate travels forward and shuts by gravity.

The oscillation of bar D is automatically effected by a passing vehicle, as follows: The front end of bar D is pivotally connected by a pitman I to a crank arm H on the end of a rock shaft J journaled in the front gate post G. On the other end of this shaft is secured a lever K, the upper end of which is pivotally connected by a rod L to an arm $m$ on a double cranked shaft M which is fastened transversely at one side of the road way, a sufficient distance in front of the gate to enable a vehicle to be driven between it and the gate. The lower end of lever K is similarly connected by a rod N to a cranked shaft O similarly situated at the opposite side of the gate. The crank shaft M, has two crank bends M', M², standing at right angles to each other, so when one is horizontal the other will be vertical. Shaft O has similar bends O', O². When one of said shafts is rocked, toward the gate, the bar D will be tilted so that the gate will open by gravity as described, and after passing through the gate-way the other shaft is rocked away from the gate and bar D will be tilted so that the gate closes by gravity. The shafts M. O. can be rocked by a passing vehicle, or animal, in the well known manner.

The pitman I and crank arm H may be formed with a series of holes, with which the bolt $i$, that connects them, can be engaged, and thus the degree of oscillation of bar D be regulated.

The bar D may be suspended from a bracket arm P, which as shown is used to stiffen the center of bar F, but by making this bracket sufficiently stout the bar F might in some cases be omitted, the pieces *f*, being used as guides however.

The gate moves endwise, transversely of the road, and teams can be driven close to it without interfering therewith in opening or closing.

Having, therefore, described my invention, what I claim as new, and desire to secure by Letters Patent thereon, is—

1. The combination of a rod suspended from an oscillating bar; stationary uprights at each end of said bar, yokes attached to said bar embracing said uprights, and a gate suspended by hangers from said rod, substantially as described.

2. The combination of the bar having downturned ends and centrally suspended from a suitable support, guide yokes attached to the outer ends of said bar, a rod strung between the ends of said bar, and an endwise movable gate suspended on said rod, substantially as specified.

3. The combination of the oscillating support, suspended above the gate-way, a longitudinal rod attached to said support and guide yokes attached to the ends of said support with a gate having an inclined bar secured to its top, hangers attached to said inclined bar engaging said rod, thereby suspending the gate on the rod, and means for oscillating said support, substantially as described.

4. The combination of a rod suspended from an oscillating bar; stationary uprights at each end of said bar, yokes attached to said bar embracing said uprights, and a gate suspended by hangers from said rod, with a rock shaft having a lever on one end and a crank arm on the other, means connected with said lever for rocking said shaft from either side of the gate; and a pitman connecting the crank arm to one end of the suspended bar, substantially as described.

5. The combination of an oscillating bar suspended above the gate-way, a longitudinal rod attached to said support and guide yokes attached to the ends of said support; a gate having an inclined bar secured to its top, and hangers attached to said inclined bar engaging said rod thereby suspending the gate on the rod; with a rock shaft having a lever on one end and a crank arm on the other; means connected with said lever for rocking said shaft from either side of the gate; and a pitman connecting the crank arm to one end of the oscillating bar, substantially as described.

In testimony that I claim the foregoing as my own I affix my signature in presence of two witnesses.

GEORGE LUTHER DUNCAN.

Witnesses:
ED. N. MASON,
ED. CRAMPTON.